United States Patent [19]

Pierce et al.

[11] 4,240,535
[45] Dec. 23, 1980

[54] CLUTCH AND BRAKE ASSEMBLY

[75] Inventors: Robert B. Pierce; Robert B. Wilson, both of Scarborough, Canada

[73] Assignee: BLM Automatic Clutch Limited, Scarborough, Canada

[21] Appl. No.: 91,551

[22] Filed: May 1, 1978

[51] Int. Cl.³ .................. F16D 67/06; F16D 43/18
[52] U.S. Cl. ........................ 192/17 C; 192/105 BA
[58] Field of Search .......... 192/105 BA, 103 B, 17 C, 192/12 D

[56] References Cited

U.S. PATENT DOCUMENTS

| 2,620,136 | 12/1952 | Levine | 192/12 D X |
| 2,675,103 | 4/1954 | Weber | 192/105 BA |
| 2,833,384 | 5/1958 | Wilson | 192/105 BA X |
| 2,975,644 | 3/1961 | Graybill | 192/105 BA X |
| 3,026,665 | 3/1962 | Hoff | 192/105 BA X |
| 3,080,952 | 3/1963 | Carlstedt | 192/105 BA X |

Primary Examiner—George H. Krizmanich
Attorney, Agent, or Firm—Robert F. Delbridge; Arne I. Fors

[57] ABSTRACT

A clutch assembly connectable to an electric motor and to another rotating unit includes a housing securable at one end to the housing of the electric motor and securable at the opposite end to the housing of the other rotating unit. A driven body within the clutch housing is rotatably mounted in a bearing supported in the clutch housing and is connectable in a driving manner to the other rotating unit. A drive body is connectable to the electric motor so as to be driven thereby and has radially movable centrifugal weights which engage and drive the driven body when the rotational speed of the drive body exceeds a predetermined value and which are disengaged from the driven body when the rotational speed is below the predetermined value.

5 Claims, 4 Drawing Figures

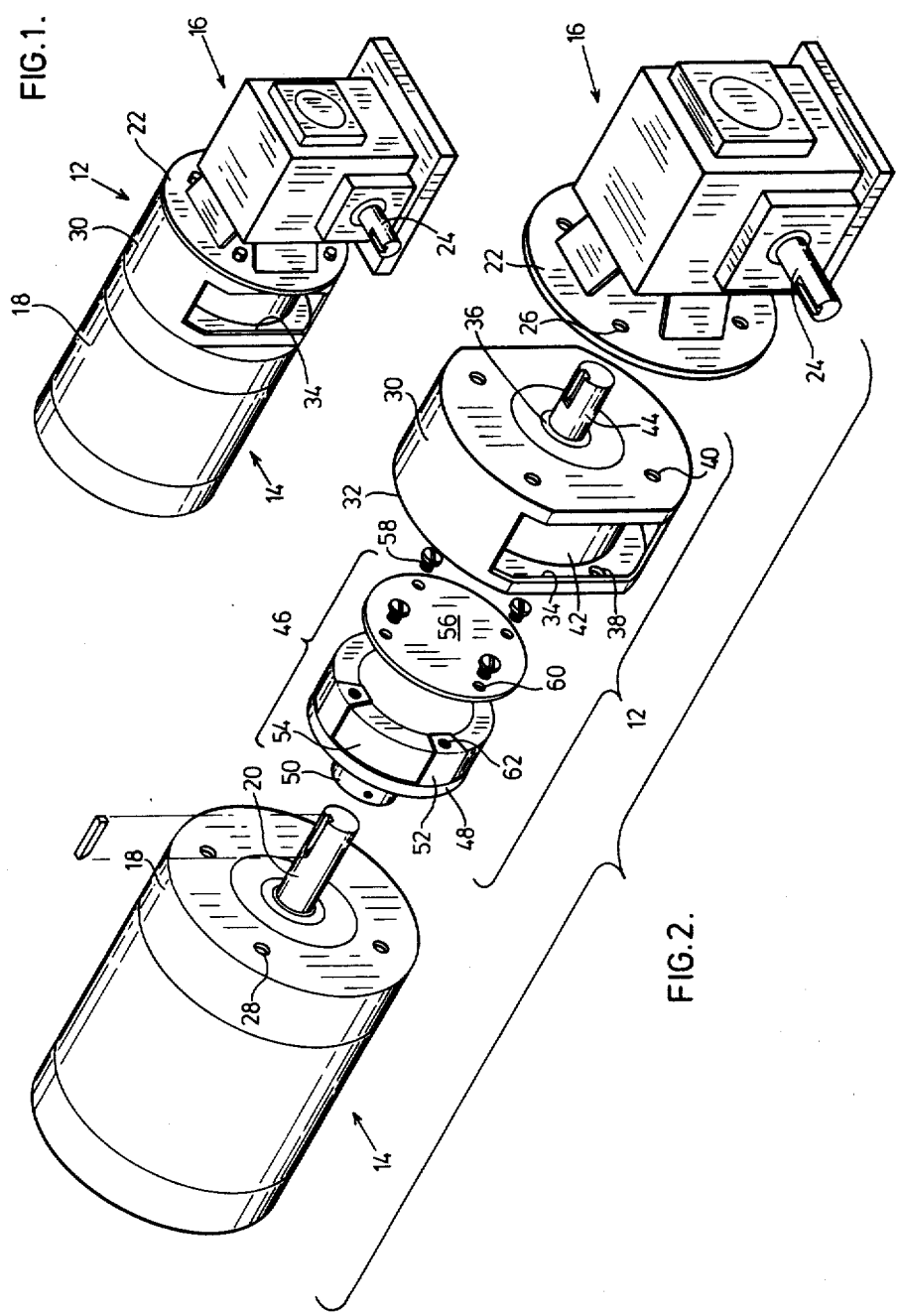

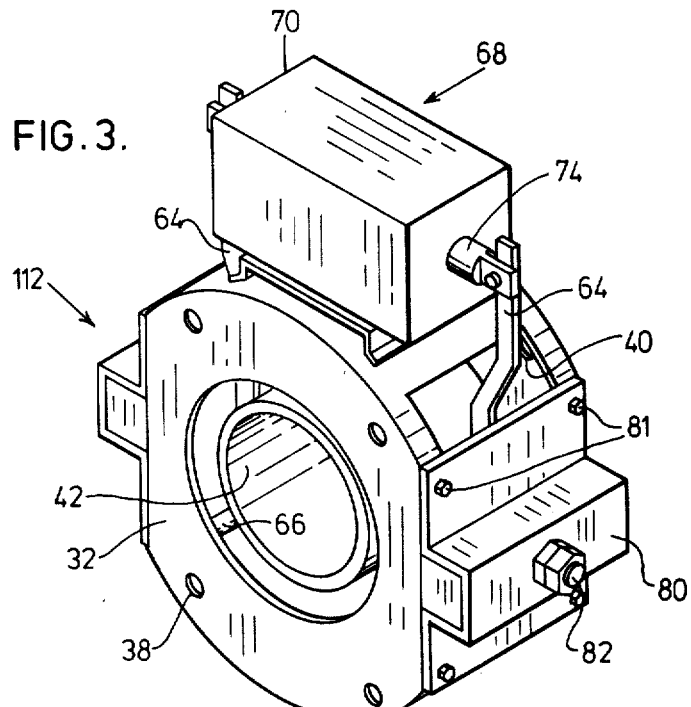
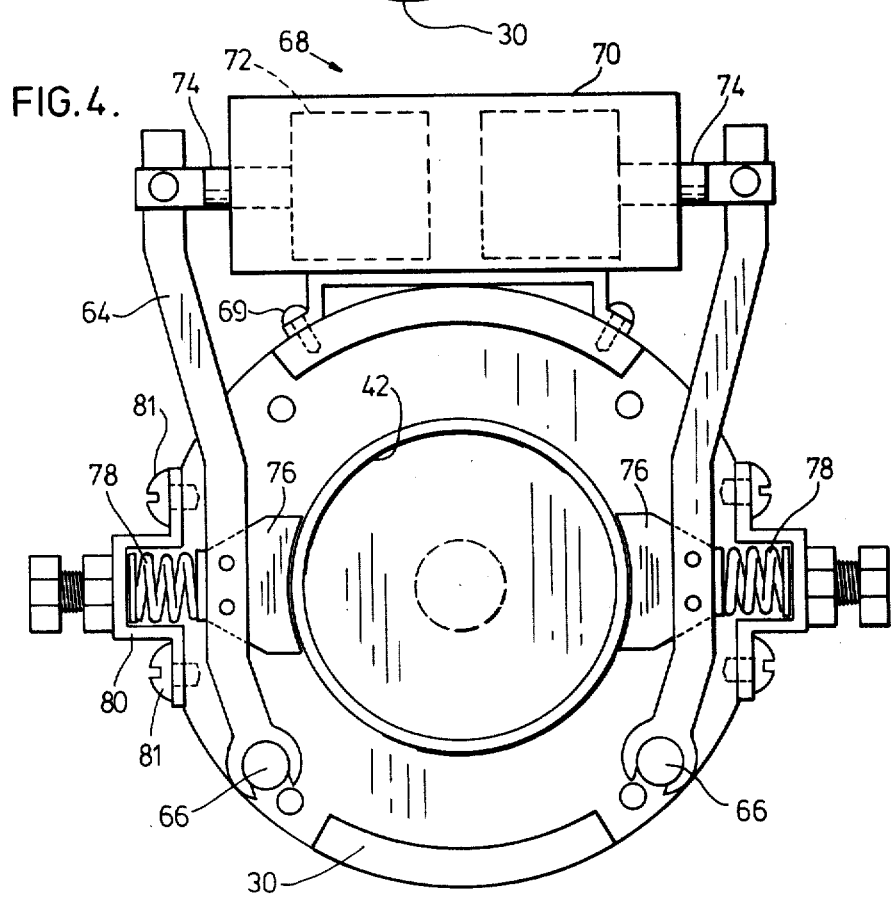

CLUTCH AND BRAKE ASSEMBLY

This invention relates to clutch assemblies for connecting or disconnecting the output shaft of an electric motor with or from the input of another rotating unit such as a gear reducer.

There are many industrial applications where an electric motor is required to be connected to a driven load through another rotating unit, such as a gear reducer. Because of the characteristics of electric motors, it is frequently desirable to provide a clutch between the output shaft of the electric motor and the other rotating unit so that the motor can be started up with the other rotating unit disengaged from the motor by the clutch, as otherwise the load on the motor during start-up would prevent the motor from starting up satisfactorily. When the motor has reached a predetermined speed, the clutch is caused to engage the motor with the other rotating unit and consequently to drive the other rotating unit and any further load connected thereto.

For various reasons, both mechanical and economic, known arrangements of this kind have not been completely satisfactory, and accordingly, it is an object of the invention to provide an improved clutch assembly for use in connection with an electric motor and another rotating unit.

According to the invention, a clutch assembly for connection to an electric motor and another rotating unit comprises a housing securable at one end to the housing of the electric motor and securable at the opposite end to the housing of the other rotating unit, a driven body within the clutch housing and rotatably mounted in a bearing supported in the clutch housing, the driven body being connectable in a driving manner to the other rotating unit, and a drive body connectable to the electric motor so as to be driven thereby, the drive body having radially movable centrifugal weights which engage and drive the driven body when the rotational speed of the drive body exceeds a predetermined value and which are disengaged from the driven body when the rotational speed is below the predetermined value.

The clutch housing may be detachably securable to both the motor housing and to the housing of the other rotating unit to form a right unit, with the output shaft of the motor drivingly engaging the drive body and with the output shaft of the driven body drivingly engaging the other rotating unit. When the motor is started, the centrifugal weights are not in driving engagement with the driven body and the motor can therefore accelerate with only the drive body forming a very light load. When the speed of the motor and consequently of the drive body reaches the predetermined value, the centrifugal force acting on the centrifugal weights is such that the centrifugal weights drivingly engage the driven body which in turn drives the other rotating unit and any load connected thereto. The electric motor is therefore under virtually no load until it reaches the predetermined speed, which can be selected to provide the best possible conditions for start-up of the electric motor and its subsequent connection to the load. Where the normal running speed of the motor is about 1750 rpm for example, the predetermined speed at which the clutch assembly is operative to connect the electric motor to the other rotating unit may be about 1400 rpm.

Thus, the present invention provides a technically satisfactory clutch arrangement in a relatively inexpensive manner.

When the motor is switched off, it will continue to be drivingly connected to the load until the speed has fallen to a speed approximately equal to the predetermined speed, that is to say until the centrifugal weights are no longer drivingly connected to the driven body.

The drive body may comprise a circular flange having an annular boss on one side for receiving the output shaft of the motor in driving engagement, and a series of peripherally spaced fingers extending axially from the opposite side of the circular flange, with the centrifugal weights being loosely mounted between respective pairs of fingers. The drive body may also comprise a cover plate detachably secured to the ends of the fingers remote from the circular flange.

The driven body may comprise a cylindrical hollow body open at one end through which the drive body is received, such that the centrifugal weights are engageable with the interior of the hollow body, and an output shaft extending from the opposite end of the hollow body and rotatably mounted in the bearing in the clutch housing, said driven body output shaft projecting from the clutch housing for driving connection with the other rotating unit.

There are many installations where it is desirable that rotation of the load be stopped as soon as possible after the motor has been switched off. The clutch arrangement of the present invention makes it possible for a brake assembly to be fitted thereto to achieve this object.

A brake assembly in accordance with this further feature of the invention may comprise a brake pad movably mounted on the clutch housing and operatively connected to an electrically-operated actuator mounted on the clutch housing in such a manner that the switching off of the electric motor also operates the actuator to cause the brake pad to be urged against the driven body to stop its rotation. The brake pad may be continually resiliently urged towards the driven body, with the arrangement being such that, when the motor is switched on, the actuator is operated to release the brake pad from the driven body. The brake pad then automatically operates to stop the rotation of the driven body when the motor is switched off, thereby providing a fail-safe arrangement. Thus, the driven body and clutch housing function as very suitable components upon which to mount the brake assembly.

Advantageously, the brake assembly may include a pair of arms extending into the clutch housing through apertures therein on opposite sides of the driven body and each pivotally secured at one end to the housing, each arm carrying a brake pad engageable with the driven body, and the opposite ends of the arms being located externally of the housing and being connected to the electrically-operated actuator.

Embodiments of the invention will now be described, by way of example, with reference to the accompanying drawings of which:

FIG. 1 is a perspective diagrammatic view showing an electric motor connected to a gear reducer by a clutch assembly in accordance with one embodiment of the invention, FIG. 2 is an exploded view similar to FIG. 1 showing various components of the clutch assembly, FIG. 3 is a perspective view of a clutch assembly fitted with a brake assembly in accordance with another embodiment of the invention, and FIG. 4 is an end view, partly broken away, of a clutch assembly of FIG. 3 showing the further details of the construction of the brake assembly.

Referring first to FIGS. 1 and 2, a clutch assembly 12 is secured at one end to an electric motor 14 and at the other end to a gear reducer 16. Electric motor 14 is of the standard kind with a housing 18 of circular section and an output shaft 20 projecting therefrom. The gear reducer 16 is also of the standard kind and has a housing 22 which at least at its input end is of circular section with a size corresponding to that of the electric motor. The input end of the gear reducer 16 has a hollow shaft (not shown) for receiving the output shaft of the clutch assembly 12 as will be described in more detail later. The gear reducer 16 also has an output shaft 24 which is connected to a load in the usual manner.

In the absence of the clutch assembly 12 of the present invention, the housing 22 of the gear reducer 16 would be detachably connected in a rigid manner directly to the motor housing 18 by bolts (not shown) passing through suitable holes 26, 28 in the gear reducer housing 22 and the motor housing 18 respectively.

The clutch assembly 12 according to one embodiment of the invention includes a cylindrical hollow housing 30 with a diameter corresponding to the diameters of the motor housing 18 and gear reducer housing 22. The clutch housing 30 is open at one end 32 and its side wall has a pair of diametrically opposite apertures 34 (only one of which is shown). A ball bearing 36 is centrally located in the opposite end of the clutch housing 34 for a purpose which will be described shortly.

The end 32 of the clutch housing 30 has holes 38 corresponding in location to the holes 28 in the motor housing 18 to receive bolts (not shown) for detachably securing the clutch housing 30 to the motor housing 18 in a rigid manner. Similarly, the opposite end of the clutch housing 30 has holes 40 corresponding in location to the holes 26 in the gear reducer housing 22 to receive bolts (not shown) for detachably securing the clutch housing 30 to the gear reducer housing 32 in a rigid manner. FIG. 1 shows in a diagrammatic manner the clutch assembly 12 detachably and rigidly secured to the motor 14 at one end and to the gear reducer 16 at the other end to form a rigid unit.

A hollow cylindrical driven body 42 is located within the clutch housing 30 and has a projecting output shaft 44 at one end which is supported in the ball bearing 36 and projects from the clutch housing 30. The driven body is thus supported in the clutch housing 30 by its output shaft 44 and the ball bearing 36. When the clutch housing 30 is bolted to the gear reducer housing 22, as previously described, the output shaft 44 is engaged in the hollow shaft of the gear reducer 16 in the same manner as the output shaft 20 of the electric motor 18 would have been engaged therein in the absence of the clutch assembly 12.

In many gear reducers of this kind, the hollow input shaft has only one bearing, with the output shaft 20 and associated bearing of the electric motor 18 providing sufficient support and alignment for the input shaft of the gear reducer 16. With the present invention, the required support and alignment is provided by the clutch output shaft 44 and its bearing 36.

The end of the driven body 42 opposite the output shaft end is open for receiving a drive body 46. The drive body 46 comprises a circular flange 48 with an annular boss 50 on one side for receiving the output shaft 20 of the motor 14. The drive body 46 also has fingers 52 extending axially from the opposite side of the circular flange 48 at peripherally spaced positions, and centrifugal weights 54 are mounted between the fingers 52. The centrifugal weights 54 are suitably shaped in relation to the fingers 52 so that they can move in a radially outward direction relative to the fingers 52.

The centrifugal weights 54 are in fact loosely mounted between the fingers 52 and are not attached to any other part of the driven body 46. A circular cover plate 56 is detachably secured to the ends of the fingers remote from the circular flange 48 by screws 58 passing through appropriately positioned holes 60, 62 in the cover plate 56 and fingers 52 respectively to prevent movement of the centrifugal weights 54 in an axial direction. The drive body 46 fits into the driven body 42 through its open end so that the centrifugal weights 54 are engageable with the internal surface of the driven body 42.

When the motor 14 is not in operation, the centrifugal weights 54 lie loosely between the fingers 54 of the drive body 46. When the motor is switched on, the motor output shaft 20 will rotate the drive body 46 but, until the motor output shaft 20 reaches the predetermined speed, the centrifugal weights 54 will not engage the internal surface of the driven body 42 with a force sufficient to cause its rotation. The motor 14 can therefore initially accelerate with only the load of the drive body 46 affecting it.

When the motor 14 reaches the predetermined speed, which will of course depend upon the construction of the drive body 46 and driven body 42, the centrifugal weights 54 are urged radially outwardly into engagement with the internal surface of the driven body 42 with such a centrifugal force that they cause the driven body 42 to rotate, with consequent rotation of the gear reducer 16 and the load connected to its output shaft 24. The motor 14 then accelerates to its running speed while driving the load.

When the motor is switched off, the speed of rotation falls and, when it has fallen to about the predetermined speed, the centrifugal weights 54 become disconnected from driving engagement with the driven body 42. The motor 14 and drive body 46 on the one hand subsequently decelerate to rest independently from the driven body 42, the gear reducer 16 and its load on the other hand.

FIGS. 3 and 4 show a further embodiment of the invention which provides for quick stopping of rotation of the driven body 42, and consequently of the gear reducer 16 and its load, when the motor 14 is switched off. The clutch assembly 112 has all the features of the clutch assembly 12 previously described, with the addition of a brake arrangement. The brake arrangement includes a pair of arms 64 extending into the clutch housing 30 through the respective apertures 34 on opposite sides of the driven body 42. One end of each arm 64 is pivotally mounted within the housing 30 on a respective axially extending rod 66 secured at its opposite ends to opposite ends of the clutch housing 30.

The other ends of the arms 64 project from the clutch housing 30 through the respective apertures 34 and are connected to an electrically-operated actuator 68 mounted on top of the clutch housing 30. The actuator 68 comprises a housing 70 secured to the clutch housing 30 by screws 69, and contains a pair of electrical solenoids 72. Solenoids 72 have actuator rods 74 which project from opposite ends of the actuator housing 70 and which are pivotally connected to a respective arm 64.

Each arm 64 carries a brake pad 76 adjacent to the driven body 42. A compression spring 78 is connected between each arm 64 and a bracket 80 secured by screws 81 to the exterior of the clutch housing 30 to urge each brake pad 76 towards the driven body 42. The spring 78 can be adjusted by a screw 82 mounted in the bracket 80.

The solenoids 72 are electrically connected to the electrical circuit of the motor 14 in such a manner that, when electric current to the motor 14 is switched on to start the motor running, electric current is also supplied to the electrical solenoids 72 to cause the actuator rods 74 to move in opposite outward directions to pivot the arms 64 in directions away from one another to release the brake pads 76 from the driven body 42 against the action of the springs 78. The driven body 42 is thus free to rotate when engaged by the centrifugal weights 54 as the motor 14 reaches the predetermined speed. The nature of the electrical circuitry required between the electric motor 14 and the solenoids 72 will be clear to a person skilled in the art, and need not be described in detail.

When electrical current to the motor 14 is switched off, electric current to the solenoids 72 is also switched off, allowing the actuator rods 14 to move inwardly into the solenoid housing 70. The springs 78 then pivot the arms 64 inwardly towards each other and press the brake pads 76 against the driven body 42, bringing it to a stop and consequently also stopping rotation of the gear reducer 16 and the load connected thereto. As the driven body 42 slows down below the predetermined speed, the centrifugal weights 54 disengage from it, and the drive body 46 and electric motor 14 decelerate to rest in the usual manner.

It will be understood that the clutch assembly of the present invention may be connected to a rotatable unit other than a gear reducer, and that the rotatable unit may itself form the load driven by the electric motor.

The possible uses and technical and economic advantages of the described embodiments will be readily apparent to a person skilled in the art, who will also appreciate that other embodiments within the scope of the invention are possible, the scope of the invention being defined by the appended claims.

What I claim as new and desire to protect by Letters Patent of the United States is:

1. In combination, an electric motor, a clutch assembly and another rotating unit, said electric motor having a housing, said clutch assembly having a housing, first means selectively detachably securing said motor housing to said clutch housing, said other rotating unit having a housing, second means selectively detachably securing said clutch housing to said unit housing, said clutch assembly having a drive body and a driven body in said clutch housing, said drive body having radially movable centrifugal weights operable to engage and drive the driven body when the rotational speed of the drive body exceeds a predetermined value and to disengage from the driven body when the rotational speed of the drive body is below the predetermined value, said electric motor having an output shaft projecting from the motor housing, said drive body having an annular boss receiving the motor output shaft, said other rotating unit having a hollow input shaft, said clutch assembly having a bearing supported in the clutch housing and an output shaft supported in the bearing and projecting from the clutch housing into the input shaft of the other rotating unit, and said first and second securing means being operable to selectively detachably secure the motor housing directly to the other unit housing in the absence of the clutch assembly.

2. The combination according to claim 1 wherein the drive body comprises a circular flange having said annular boss on one side receiving the output shaft of the motor in driving engagement, and a series of peripherally spaced fingers extending axially from the opposite side of the circular flange, with the centrifugal weights being loosely mounted between respective pairs of fingers.

3. The combination according to claim 2 wherein the drive body also comprises a cover plate detachably secured to the ends of the fingers remote from the circular flange.

4. The combination according to claim 1 wherein the driven body comprises a cylindrical hollow body open at one end through which the drive body is received, such that the centrifugal weights are engageable with the interior of the hollow body, said output shaft extending from the opposite end of the hollow body.

5. A clutch assembly connectable between an electric motor with a projecting output shaft and another rotating unit with a hollow input shaft of a size to receive the motor output shaft, said clutch assembly comprising a housing detachably securable at one end to the housing of the electric motor and detachably securable at the opposite end to the housing of the other rotating unit, a driven body within the clutch housing, said driven body having an output shaft rotatably mounted in a bearing supported in the clutch housing, and projecting from the housing for insertion into the input shaft of the other rotating unit, and a drive body having radially movable centrifugal weights which engage and drive the driven body when the rotational speed of the drive body exceeds a predetermined value and which are disengaged from the driven body when the rotational speed is below the predetermined value, said drive body having an annular boss for receiving the output shaft of the electric motor, further comprising a brake assembly including an electrically operated actuator mounted on the clutch housing, and a pair of arms extending into the clutch housing through apertures therein on opposite sides of the driven body, each arm being pivotally secured at one end to the clutch housing, and each arm carrying a brake pad engageable with the driven body, and the opposite ends of the arms being located externally of the housing and being connected to the electrically-operated actuator to enable operation of the actuator to result in tbe brake pad being urged against the driven body to retard its rotation.

* * * * *